INVENTOR
JOHN F. MORRISSEY
BY Paul, Paul & Moore
ATTORNEYS

April 14, 1925.  
J. F. MORRISSEY  
1,533,327  
AUTOMATIC SELF LOCKING DIFFERENTIAL GEARING  
Filed May 21, 1923   3 Sheets-Sheet 3

INVENTOR
JOHN F. MORRISSEY
ATTORNEYS

Patented Apr. 14, 1925.

1,533,327

UNITED STATES PATENT OFFICE.

JOHN FR. MORRISSEY, OF ANTIGO, WISCONSIN.

AUTOMATIC SELF-LOCKING DIFFERENTIAL GEARING.

Application filed May 21, 1923. Serial No. 640,437.

*To all whom it may concern:*

Be it known that I, JOHN F. MORRISSEY, a citizen of the United States, resident of Antigo, in the county of Langlade and State of Wisconsin, have invented certain new and useful Improvements in Automatic Self-Locking Differential Gearing, of which the following is a specification.

This invention relates to improvements in differential gearing such as is commonly used in connection with automobiles, or power propelled vehicles, and has a specific object to provide means for automatically locking both of the driven wheels or members together to as to rotate as a unit, when there is a tendency for either wheel to race or spin, thereby, equally distributing the power from the motor to both driven wheels.

It is well known that the common type of differentials, universally used in automobiles permit the driven wheels to rotate relatively at different speeds when turning corners. The above type of differential also permits the rapid idling of one driven wheel with reference to the other, should it become disengaged from the ground in some manner, or engage a slippery spot in the surface of the road, thereby decreasing its frictional contact with the ground, while the other wheel may be prevented from rotation due to a better frictional contact with the ground. When the above condition occurs, it often becomes impossible to further propel the automobile or vehicle by its own power until the above condition has been removed.

The novel differential gearing herein shown, permits, within a predetermined limit, the usual differential function. However, means are also provided, whereby, when such limit has been exceeded, there automatically results a positive drive for both driven wheels, thus eliminating the difficulty heretofore referred to.

The object of this invention, therefore, is to provide an improved differential gearing.

Other objects of the invention will more fully appear from the following detailed description and the accompanying drawings and will be pointed out in the annexed claims.

In the accompanying drawings there has been disclosed a structure designed to carry out the objects of the invention but it is to be understood that the invention is not confined to the exact features shown, as various changes may be made within the scope of the claims which follow.

Figure 1:
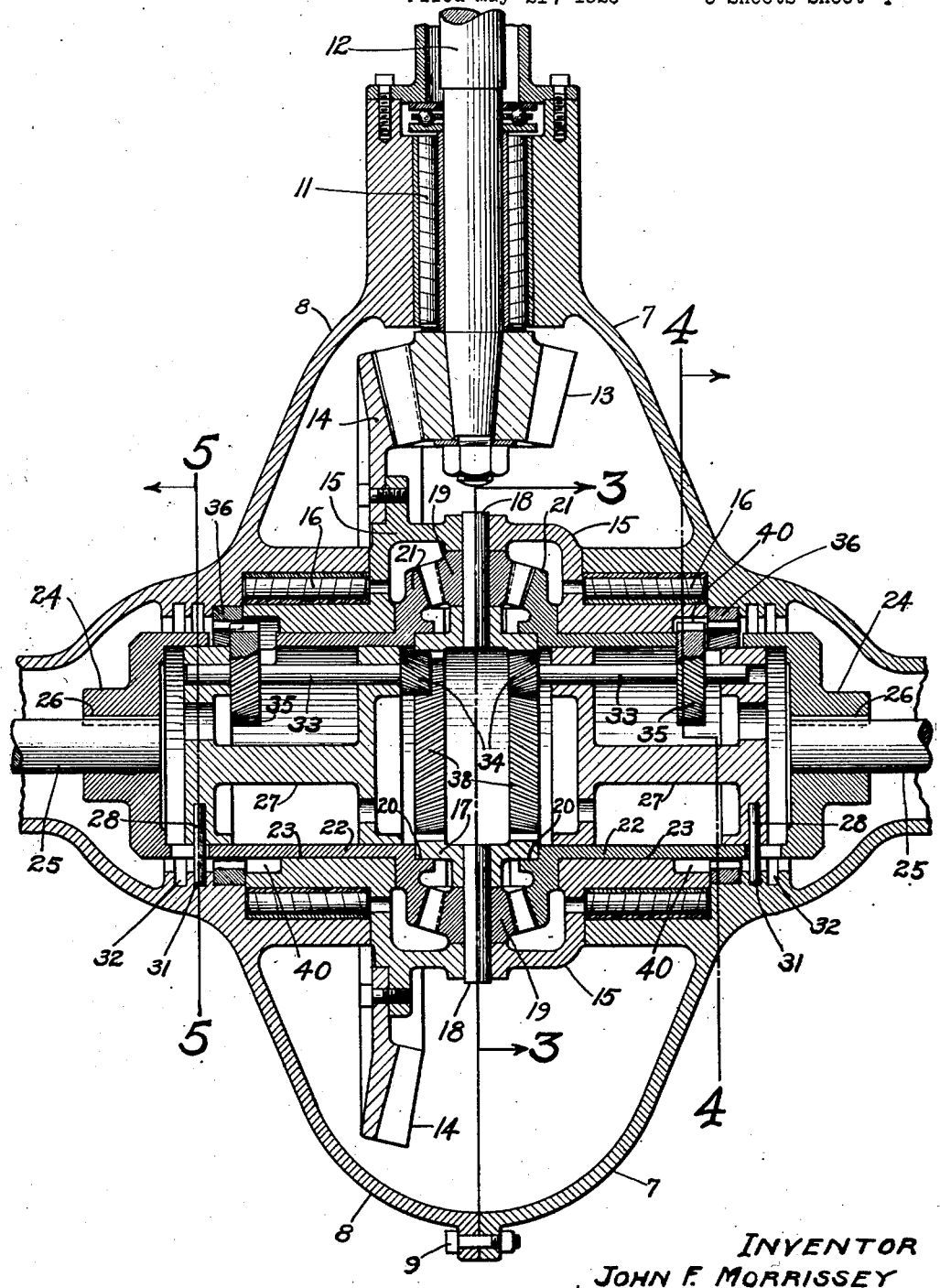
Figure 1 is a horizontal sectional view of a differential and showing my invention applied thereto.

In the selected embodiment of the invention here shown for the purpose of disclosure, there is illustrated a differential housing of usual construction comprising a right part 7 and left part 8, joined together by bolts 9. The usual bearing 11 is provided at the forward end of the housing for the drive shaft 12 carrying the usual drive pinions 13 which engages the bevel ring gear 14, secured to the differential case 15, rotatably mounted in anti-friction bearings 16 provided in the differential housing. A differential spider 17 is provided within the case 15 and has radial pins 18, usually three or four in number, secured thereto and projecting outwardly therefrom through apertures provided in said case. The usual differential or spider pinions 19 are rotatably mounted upon the pins 18 and adapted to be in engagement with the differential side pinions 21, preferably provided with outwardly extending sleeves, 22 rotatably mounted in suitable bearings 23 in the differential case 15. Hubs 24, preferably integral with the outer ends of the sleeves 22 are provided for the purpose of supporting the inner terminal ends of the driven members or shafts 25, rigidly secured thereto by suitable keys 26. Suitable bearings 20 are also preferably provided in the inner ends of said sleeves to receive and support the spider 17, rotatably mounted therein. I have here shown the differential pinions 21 as being integrally formed with the sleeves 22. They may, however, be constructed independently of the sleeves and mounted thereon by any suitable means desired. As the two sides of the differential are identical it will be necessary to describe but one side, like parts being represented by like numerals.

A carriage or slide 27 is slidably mounted within the sleeve 22 and is provided with a plurality of radial pins 28 secured thereto, adjacent its outer end and projecting outwardly therefrom through elongated apertures 29, in the sleeves. The outer ends of these pins are adapted to engage a pair of annular grooves 31 and 32, provided in the housing, and function in limiting the lateral movement of the carriage 27 within said sleeve. A short shaft 33 is rotatably and slidably mounted in the carriage 27 and is provided at its inner end with a small spiral pinion 34, preferably integral therewith. A similar pinion 35, preferably larger in diameter, is mounted upon the shaft adjacent its outer end and is adapted to engage an internal spiral gear 36 rigidly mounted within the differential housing by suitable means, such as keys or pins 37. An annular recess 40 is provided at the outer ends of the hubs of the differential case 15 to provide clearance for the pinion 35 when disengaged from the gear 36. A pair of internal spiral gears 38 are also provided within the spider 17, and are preferably integrally formed therewith, and adapted to receive the spiral pinions 34.

Referring to Figure 1, it will be noted that the pinion 35 and gear 36, shown on the right hand side of the figure are both left hand spirals, while the corresponding pinion and gear on the left hand side of the figure are right hand spirals. Also the pinion 34 and gear 38, shown on the right hand side of the figure, are right hand, while the corresponding pinion and gear on the left hand side of the figure are both left hand spirals.

On the right hand side of the above figure, the parts are shown in their inoperative position, or, the position assumed when the relative rotation of the driven members 25 is within the predetermined limit, heretofore mentioned, said limit being fixed by the ratio between the two pairs of gears provided on each side of the differential and above described. Also the pinion 35 will be disengaged from the gear 36 and the pinion 34 will be in full engagement with the gear 38, while the relative movement between the spider 17 and the carriage 27 will be very slight, being zero when the driven members 25 rotate at synchronous speed, as when the vehicle is traveling in a straight line, while the carriage will increase its rotation with reference to the spider when turning to the left, and decrease its speed when turning to the right, due to being directly connected to the differential side pinion 21 by means of the pins 28 and apertures 29.

Assuming now that the driven wheel on the right hand side of the vehicle engages a slippery spot in the road surface and starts to idle or spin; the speed ratio between the spider 17 and the carriage 27 will change, caused by the usual differential action of the side pinion 21 and the differential pinions 19. The result of this action will cause the sleeve and carriage to rotate at an exceedingly high speed, with reference to the spider, and the pinion 34 being in engagement with the gear 38 will start to rotate the shaft 33 in its bearings in the carriage, thereby rotating the pinion 35 in the reverse direction to the carriage. The means for shifting the pinion 35 into engagement with the gear 36 is accomplished by the angle of the teeth in the pinion 34 and the gear 38. This angle is such as to cause the pinion 34 to move outwardly as it rolls around in the gear 38, but is held by the outer ends of the teeth in the pinion 35 engaging the inner ends of the teeth in the gear 36. However, as soon as the peripheral speed of the pinion 35 allows it to slide into engagement with the gear 36, the shaft 33, carrying the pinions 34 and 35, will be moved outwardly to the position shown on the left hand side of Figure 1, thereby securely locking the driven member 25 to the spider 17 and thus preventing said member from further idling, the power from the motor being transmitted through the shaft 33 to the driven member 25. As soon as the rotation of the wheel tending to idle, has been reduced to normal, the pinion 35 rolling in the gear 36 will be moved inwardly out of engagement with said gear, due to the angularity of the teeth, and the carriage and spider rotating at the same speed, will permit the pinion 34 to be returned to its normal position in full engagement with the gear 38.

Means are also provided to positively prevent both sides of the differential from functioning simultaneously when the vehicle is reversed. By referring to Figure 1, it will be readily seen that as the differential spider 17 starts to reverse, it will disengage both pinions 34 from the gears 38, due to the angularity of their teeth, and slide the pinions 35 into engagement with the stationary gears 36, thereby locking both sides of the differential at the same time which would cause the entire rear axle to become inoperative. Means are therefore provided whereby the above condition may be positively eliminated.

Figure 2:
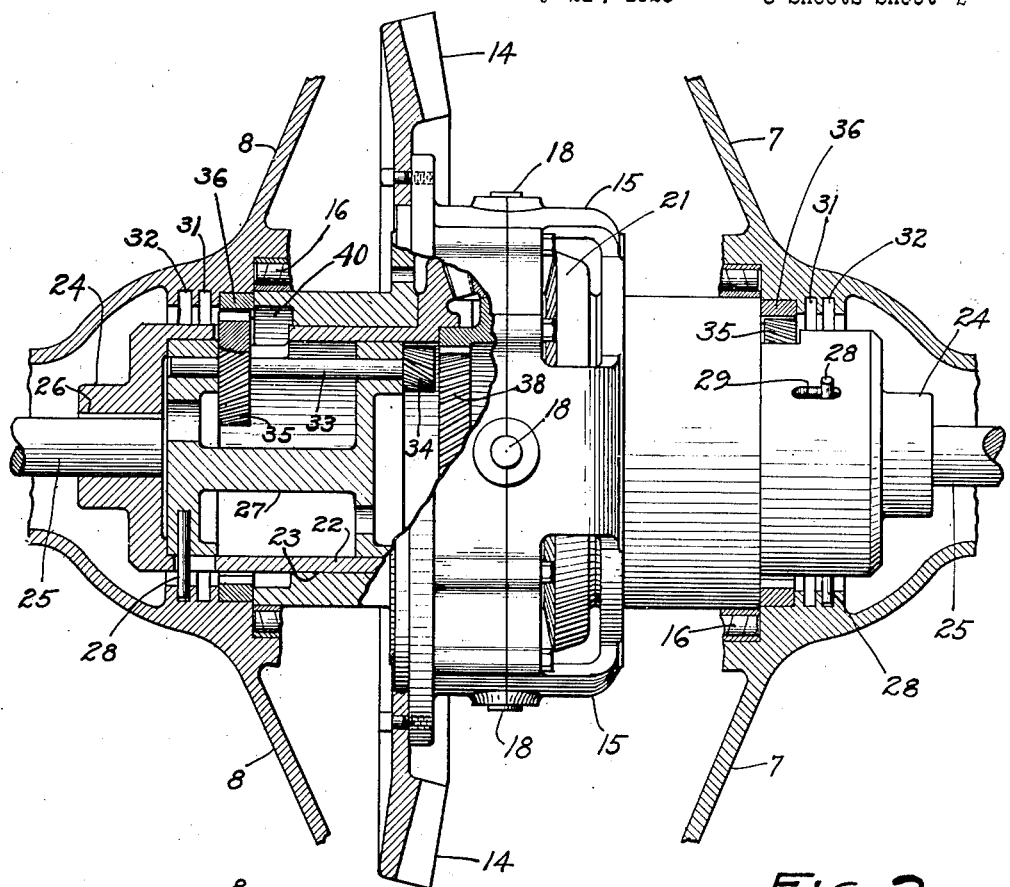
Figure 2 is fragmentary view, partially in section and partially in elevation and showing the position of the parts when the driven wheels are reversed.
Figure 6:
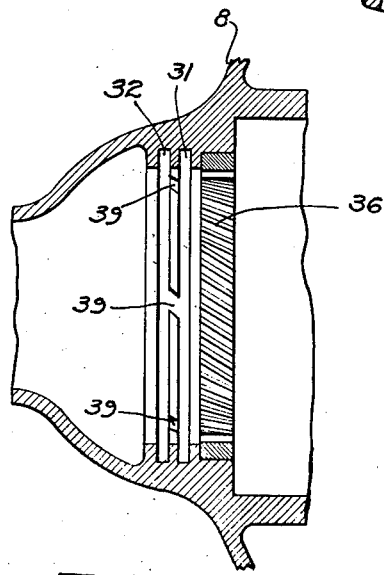
Figure 6 is a fragmentary detail view showing the means provided in the housing for shifting the position of the carriages.
Figure 3:
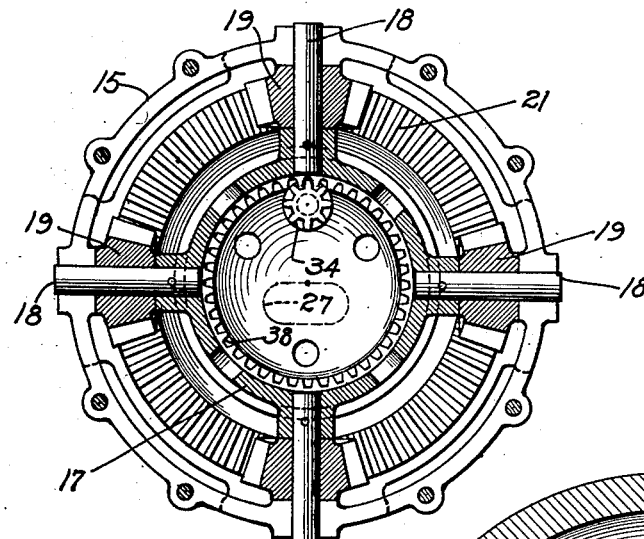
Figure 3 is a transverse sectional view on the line 3—3 of Figure 1.
Figure 4:
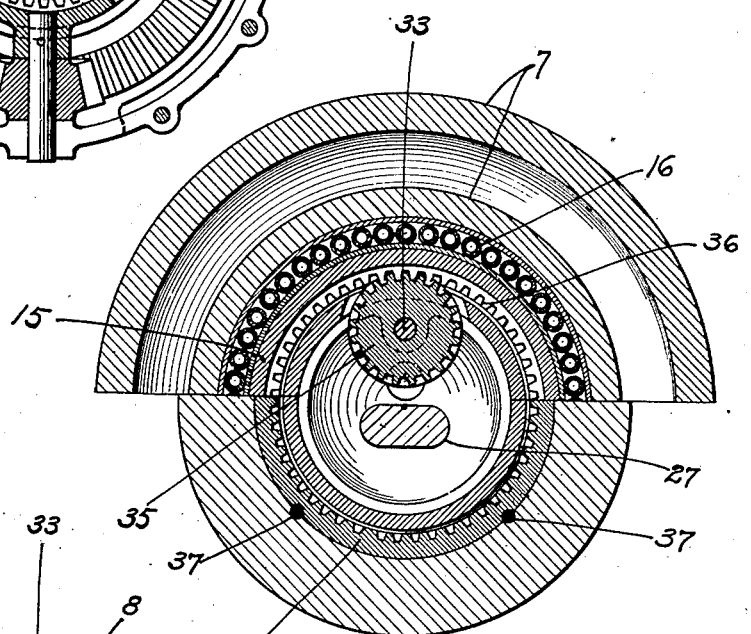
Figure 4 is a transverse sectional view on the line 4—4 of Figure 1.
Figure 5:
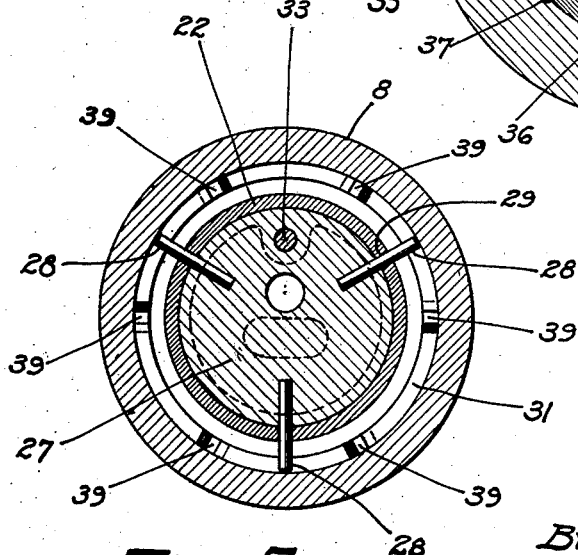
Figure 5 is a similar view on the line 5—5 of Figure 1.

Diagonal passages or openings 39 are preferably provided in the walls between the grooves 31 and 32, as shown in Figures 5 and 6, their function being to permit the pins 28 to pass from one groove to the other as the vehicle is moved forwardly or rearwardly. As soon as the vehicle starts a reverse movement the two carriages 27, due to the action of the teeth in the pinions 34 and gears 38, will tend to move outwardly, and as the pins 28 traveling in the grooves 31 engage the passages 39, they will pass through said passages to the grooves 32, thus moving the two carriages outwardly and permitting the pinions 34 to become disengaged from the gears 38. When in this position, the pinions 35 will be in full engagement with the stationary gears 36, as shown in Figure 2. Should one driven member start to idle during the reverse movement of the vehicle the mechanism will function as hereinbefore described. As soon as the vehicle again starts a forward movement, the pins 28 will pass from the grooves 32 through the passages 39 to the grooves 31, thereby restoring the carriages to their normal positions as shown in Figure 1.

I claim as my invention:

1. A differential gearing comprising members mounted for relative rotation, a spiral gear mechanism, and means co-operable therewith upon a predetermined racing of either member positively to drive the other member.

2. A differential gearing comprising members mounted for relative rotation, spiral gears mounted to slide toward and from said members, and stationary means adapted to be engaged by said spiral gears upon a predetermined racing of either member positively to rotate the other member.

3. A differential gearing comprising a housing, members mounted for relative rotation therein, spiral gears mounted in said housing and axially movable therein, and means adapted to be engaged by the spiral gears upon a predetermined racing of either member positively to drive the other member.

4. A differential gearing comprising members mounted for relative rotation, a sleeve secured to each member and concentrically revoluble therewith, and a spiral gear mechanism automatically operable upon a predetermined relative movement between said sleeves positively to drive both sleeves whereby both members are positively driven.

5. A differential gearing comprising members mounted for relative rotation, gear pinions and sleeves thereon, a revoluble spider interposed between the gear pinions and sleeves, gear rings carried by the spider, stationary gear rings encircling the sleeves, and pinions mounted for movement into or out of mesh with the spider rings for reducing the idling speed of either member when it exceeds a predetermined peripheal speed.

6. A differential gearing, comprising members mounted for relative rotation, gear pinions and sleeves thereon, a revolving spider interposed between said gear pinions and sleeves, spiral gear rings mounted in said spider, stationary gear rings encircling said sleeves, and spiral pinions mounted for movement into or out of mesh with said spiral rings, for reducing the idling speed of either member when it exceeds a predetermined peripheral speed, or releasing said member.

7. A differential gearing comprising members mounted for relative rotation, gear pinions having sleeves thereon to revolve therewith, a spider interposed between said sleeves and having driving connection with said pinions, spiral gear rings mounted in said spider, carriages mounted to slide in said sleeves, stationary spiral gear rings, spiral pinions mounted in said carriages to engage respectively said stationary gear rings and said spider gear rings, for reducing the idling speed of either member when it exceeds a predetermined peripheral speed.

8. A differential gearing, comprising members mounted for relative rotation, revolving and stationary spiral gear rings, spiral gear pinions mounted to mesh respectively with said gear rings, and having an axial movement toward and from said gear rings to mesh therewith or be separated therefrom for controlling the idling speed of either member, and means permitting the disengagement completely of said spiral gear pinions from said revolving gear rings when said differential is reversed.

9. A differential gearing, comprising members mounted for relative rotation, revolving and stationary spiral gear rings, spiral gear pinions mounted to mesh respectively with said gear rings, and having an axial movement toward and from said gear rings to mesh therewith or be separated therefrom for controlling the idling speed of either member, and means permitting the disengagement completely of said spiral gear pinions from said revolving gear rings when said differential is reversed, said means including annular grooves having slotted flanges between them, and pins mounted to slide in said grooves and pass through said slots from one groove to the other when the gear ring is reversed.

10. A differential gearing, comprising members mounted for relative rotation, sliding carriages, means mounted in said carriages for reducing the idling speed of either member when said member reaches a predetermined peripheral speed, a housing having annular grooves therein, and slotted flanges between said grooves, and pins mounted in said carriages to slide in said grooves and pass through said slots from one groove to the other when said gearing is reversed.

11. A differential gearing comprising members mounted for relative rotation, mechanism operable differentially to drive the members, slidable carriages, means on the carriages co-operable with said mechanism and operable upon a predetermined racing of either member positively to drive the other member, an element having a plurality of intercommunicating annular grooves, means on the carriages co-operable with the grooves to maintain said slidable carriages in normal position, and each of said carriage means being adapted to pass from one intercommunicating groove to another upon reversal, whereby said positive drive is maintained operative during reversal.

12. A differential gearing comprising members mounted for relative rotation, a spiral gear mechanism, means co-operable therewith upon a predetermined racing of either member positively to drive the other member, and means co-operable with said spiral gear mechanism, upon reversing of the gearing, to maintain operative said positive drive means.

13. A differential gearing comprising members mounted for relative rotation, mechanism operable differentially to drive the members, slidable carriages, means on each carriage co-operable with said mechanism and operable upon a predetermined racing of either member positively to drive the other member, an element having a set of intercommunicating annular grooves adjacent each carriage, means on each carriage co-operable with its adjacent set of grooves to maintain its slidable carriage in normal position, and each carriage means being adapted to pass from one to another of the intercommunicating grooves of a set upon reversal whereby said positive drive is maintained operative during reversal.

In witness whereof, I have hereunto set my hand this 6th day of Sept., 1922.

JOHN FR. MORRISSEY.